S. Pierce.
Cooking Stove.
No. 99.
Reissued July 31, 1847.
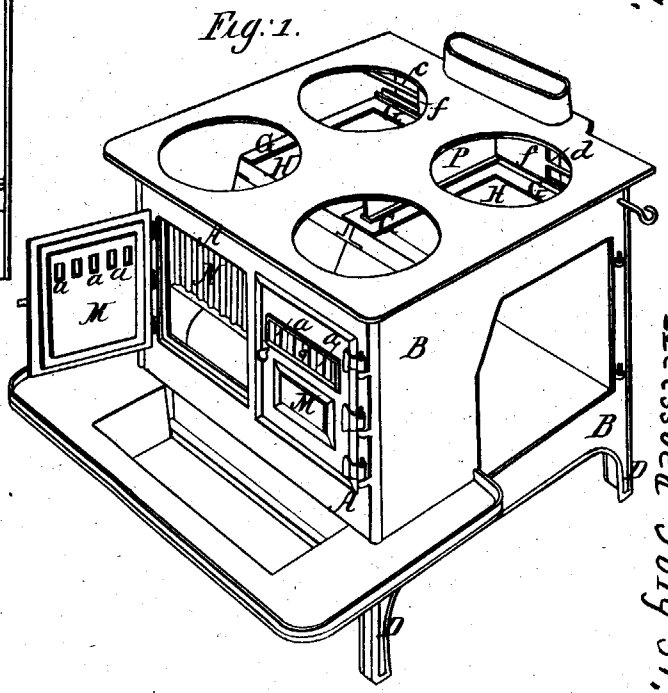
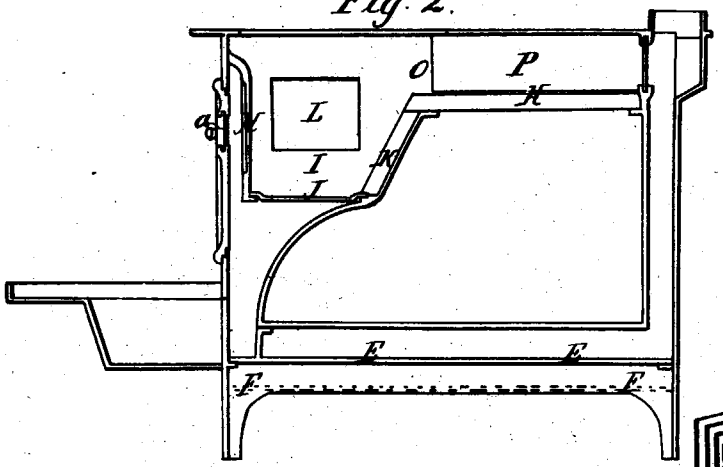
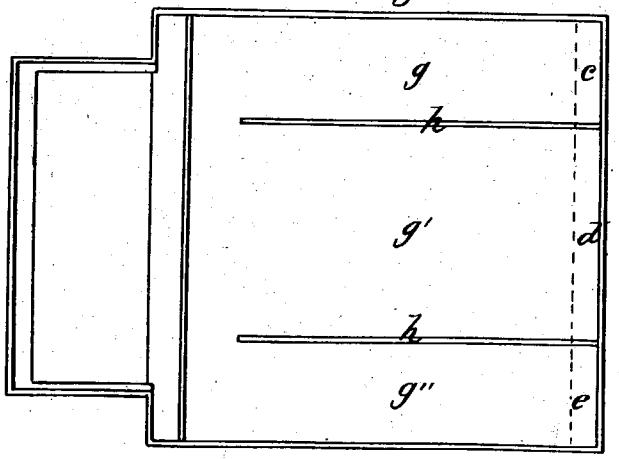

UNITED STATES PATENT OFFICE.

SAMUEL PIERCE, OF TROY, NEW YORK, ASSIGNOR TO JOHNSON & COX, OF SAME PLACE.

IMPROVEMENT IN COOKING-STOVES.

Specification forming part of Letters Patent No. ——, dated December 6, 1845; Reissue No. 91, dated April 24, 1847; Reissue No. 99, dated July 31, 1847.

*To all whom it may concern:*

Be it known that I, SAMUEL PIERCE, of Troy, in the county of Rensselaer and State of New York, (formerly of Peeksville, in the county of Westchester, in the same State,) have invented new and useful Improvements in the Cooking-Stove; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a plan of the stove with the top plate removed; Fig. 2, a vertical longitudinal section; Fig. 3, a front elevation; Fig. 4, a horizontal section taken at the line X X of Fig. 2, and Fig. 5 a cross vertical section taken at the line Z Z of Fig. 2.

The same letters indicate like parts in all the figures.

One of the most serious objections to baking in cooking-stoves arises from confining the vapors or gases evolved from the articles under treatment in the oven, which, from the closed nature of the ovens and the material (iron) of which they are composed, does not permit their escape, and thus imparts a disagreeable flavor to articles baked therein. To avoid this serious objection numerous devices have been invented to permit the escape of the noxious gases, which devices not only add to the cost and complexity of the stove, but at the same time waste much of the heat. Another objection arises from the difficulty of heating the different parts of the oven equally, for if any part be unduly heated it will be obvious that articles under treatment will be unequally baked. To avoid this latter difficulty various arrangements of flues and interposed air-chambers have been devised to impede the radiation of heat; but all these plans are more or less complex and liable to derangement, and but partially effect the one purpose of equalizing the heat.

The object of the first part of my invention is to avoid the two difficulties above pointed out by one and the same means, which consists in combining with the oven made of iron a top made of fire-brick or other refractory earthy substance, inserted like panels in an iron frame, so that the flame and highly-heated gases and other products of combustion in passing directly over the oven from the fire to the diving-flues in the back shall act on this earthy substance, instead of on iron, as heretofore. The heat being much greater in the flues at the top in stoves of this construction than in the diving-flues at the back and the flues at the bottom, the interposition of fire-brick or other earthy substance of slight conducting property reduces the heat conducted through the top to about an equality with that given out through the back and bottom, and thus equalizes the temperature to bake equally; but this mode of construction at the same time effects the other important end referred to. It permits the escape in the most efficient manner of the gases evolved from the articles under treatment, and thereby greatly improves their flavors. Fire-brick and other earthy substances are known to be porous and to have the quality of absorbing moisture and of giving it out under the action of heat. As the vapors are given out, they, of course, from their rarefied condition, rise to the top, and will then be absorbed by the fire-brick top, which, being more highly heated on the upper than on the under surface by reason of the passage of the flame directly over and in contact with it, will give out at the upper surface what is absorbed below, the moisture being conducted through the pores by exhaustion and evaporation, these operations being aided by a well-known physical law—viz., that the passage of a current of air over the opening of a tube by exhaustion has the effect to exhaust, so that as the heated current produced by the draft passes over the small apertures or pores of the fire-brick these are exhausted, which facilitates the passage through them of the vapors absorbed by the under surface.

The second part of my invention consists in leaving a space between the front of the fire-chamber and the front of the stove, when this is combined with an opening in the outer plate and near the top through which the air that is to feed the fire is to enter, so that in passing down between the front plate of the fire-place and the front plate of the stove it shall be treated preparatory to its entrance under the fire.

The third part of my invention consists in making the top plate of that part of the oven which extends under the fire-chamber or grate in a curve or inclined plane running down to the ash-pan below and in front, so that the ashes as they fall through the grate run down the surface of this plate of the oven by their weight and are deposited in the ash-pan, thus constituting a stove which clears itself of ashes, leaving that part of the oven to be heated by radiation from the fire in the grate without the interposition of ashes, as heretofore, which act as a rather bad or irregular conductor of heat, which varies the heating of the oven not alone in proportion to the heat in the grate, but by the quantity of ashes below the grate. By this arrangement I not only attain the advantages above pointed out, but I avoid the burning of the grate, which so frequently occurs when that part of the oven is so formed (as heretofore) as to answer the purpose of an ash-pan, for by the old construction whenever by negligence the ashes are suffered to accumulate and extend up to the grate they (the ashes) do not permit the escape of heat from the grate, which in consequence burns out or warps in a very short time and requires to be renewed.

In the accompanying drawings, *a* represents the fire-chamber, and *b* the oven, which extends partly under the fire-chamber, and runs up diagonally to make the inclined fire-back *c*, which is made double, with an air-chamber, *d*, between its two plates for the circulation of air to prevent the burning of the fire-back. The top of this oven, over which the flame and other products of combustion immediately pass on their way to the diving-flues, is composed of slabs of fire-brick *e e*, inserted and secured in the following manner: An iron frame, *f*, rests on flanges or ledges *g*, that project from the side plates, *h h*, of the stove and from the back and front plate of the oven, (the latter making part of the fire-back,) and in this frame are placed the two slabs of fire-brick *e e*, they being slipped in from the front between the frame and another set of ledges or flanges, *i*, and then a vertical division-plate, *k*, is inserted between the two, this being also provided with flanges *l l*, to hold down the slabs onto the middle rib of the frame. The front plate of the fire-back is then put in, which completely secures the slabs in place. The edges should be cemented to insure better joints. The central partition, *k*, divides the draft from the fire-chamber in two, to lead to the two side diving-flues, *m m*, back of the oven, and from these it passes along the side bottom flues, *n n*, to the front, around the division-plates *o o*, and back through the middle flue, *p*, to the middle flue in the back on its way to the exit pipe or chimney. The two diving-flues *m m* are provided with a sliding damper, *q q*, by which they can be closed when it is desired to carry the draft directly out through apertures *r r* in the back to the exit-pipe, the sliding dampers *q q* being made to slide over and close these apertures when the diving-flues are open, and vice versa. In front of the fire-chamber there is a plate, *s*, which stands back from the front plate, *t*, of the stove, so as to leave a space, *u*, between them for the passage of air which enters through holes *v* in the front plate or doors and on its passage down in front of the plate *s* and on its way to feed the fire becomes highly heated by the radiation of heat through the front plate, *s*, of the fire-chamber. That part of oven *b* which extends under the fire-chamber or grate has the upper and front plate made in one single plate, curved from the rear open part of the grate *a'* to *b'*, and then extending down obliquely to the summer arrangement *c'*, so that the heat radiated downward from the fire on the grate strikes the entire surface of this plate to heat the oven, this plate at the same time presenting a curved and inclined surface, on which the ashes will slide as they fall from the grate and run down into the ash-pan *d'* of the summer arrangement. The front plate, *t*, of the stove prevents the too rapid escape of the heat radiated downward from the fire on the grate. The curve of this plate may be varied at pleasure; or, if desired, it may be simply an inclined plate; but I prefer to make it of the form above described.

It will be obvious that the front plate of the stove may be the front of the fire-chamber, and that the space for the passage of the air may then be formed by swelling out the doors.

The mode above described of inserting and securing the fire-brick is deemed to be the best; but it will be evident that this may be varied at pleasure, so long as the upper surface of the fire-brick or earthy substance which forms the top is exposed to the passage of the flame and other products of combustion, and the under surface to the vapors or gases evolved in the oven.

What I claim as my invention, and desire to secure by Letters Patent, is—

1. Making the top of the metal ovens of cooking-stoves of fire-brick or other earthy substance, when this is combined with a stove in which the products of combustion from the fire-chamber pass first over the top of the oven, substantially as described, whereby the heat in the oven is equalized, and the vapors or gases evolved in the oven are absorbed and carried off, as described.

2. The arrangement of the parts by which I supply the fire with heated air, said arrangement consisting, mainly, of the aperture in the front plate or doors, and the plate *s*, in front of which the air must descend on its passage to the grate-bars. The heating of the admitted air has been attempted under other arrangements, and I limit myself in this particular, therefore, to the special combination of parts by which I attain this end.

3. Making the plate of that part of the oven which extends under the grate in the manner substantially as described, and connected with a receptacle for ashes at the bottom for the purpose of discharging the ashes that fall from the grate, as described, whereby I am enabled to heat this part of the oven more effectually and equally and to avoid the burning out of the grates, as described.

SAMUEL PIERCE.

Witnesses:
CHS. M. KELLER,
J. M. THAYER.